(12) United States Patent
Ihle et al.

(10) Patent No.: US 8,203,242 B2
(45) Date of Patent: Jun. 19, 2012

(54) ELECTRICALLY COMMUTATED DC MOTOR FOR A LIQUID PUMP

(75) Inventors: Olai Ihle, Eckental (DE); Georg Bernreuther, Nürnberg (DE); Klaus Weiske, Nürnberg (DE)

(73) Assignee: Bühler Motor GmbH, Nürnberg (DE)

( * ) Notice: Subject to any disclaimer, the term of this patent is extended or adjusted under 35 U.S.C. 154(b) by 372 days.

(21) Appl. No.: 12/654,240

(22) Filed: Dec. 15, 2009

(65) Prior Publication Data

US 2010/0158724 A1 Jun. 24, 2010

(30) Foreign Application Priority Data

Dec. 19, 2008 (DE) .......................... 10 2008 064 159

(51) Int. Cl.
*F04D 13/06* (2006.01)
(52) U.S. Cl. ................. 310/71; 310/63; 310/87
(58) Field of Classification Search .................. 310/52, 310/54, 62, 63, 70 A, 70 R, 71, 86–88; 417/423.7
See application file for complete search history.

(56) References Cited

U.S. PATENT DOCUMENTS

| | | | | |
|---|---|---|---|---|
| 4,096,625 A | * | 6/1978 | Morreale | 29/596 |
| 4,250,419 A | * | 2/1981 | Zolman | 310/68 C |
| 4,287,446 A | * | 9/1981 | Lill et al. | 310/71 |
| 2003/0086800 A1 | * | 5/2003 | Kurihara et al. | 417/423.7 |
| 2005/0046289 A1 | * | 3/2005 | Uchida et al. | 310/71 |
| 2006/0175917 A1 | * | 8/2006 | Nanbu et al. | 310/71 |
| 2007/0001525 A1 | * | 1/2007 | Schneider et al. | 310/71 |
| 2007/0001534 A1 | | 1/2007 | Kojima et al. | |
| 2007/0103014 A1 | * | 5/2007 | Sumiya et al. | 310/71 |

FOREIGN PATENT DOCUMENTS

| | | |
|---|---|---|
| DE | 196 46 617 | 5/1998 |
| WO | WO 2004/042891 | 5/2004 |
| WO | WO 2005/011087 | 2/2005 |

* cited by examiner

*Primary Examiner* — Quyen Leung
*Assistant Examiner* — Naishadh Desai
(74) *Attorney, Agent, or Firm* — Jacobson Holman PLLC

(57) ABSTRACT

An electrically commutated DC motor (1) for a liquid pump (2) with a pump housing (3) with a suction connector (4) and a pressure connector (5) for connection to a hydraulic circuit, an essentially disk-like pump rotor (6) mounted to rotate in the pump housing, consisting of an impeller (7) with several pump vanes and a permanent magnet (8), a partition (11) separating a pump space (9) from a dry space (10), the partition being arranged in an axial gap (12) between the pump rotor (6) and several axially aligned stator poles (14), each provided with an insulation element (15) and stator windings (16). The task of the present invention is to configure a DC motor, so that it can be installed simply and reliably, is designed particularly robust and therefore has very high lifetime.

21 Claims, 6 Drawing Sheets

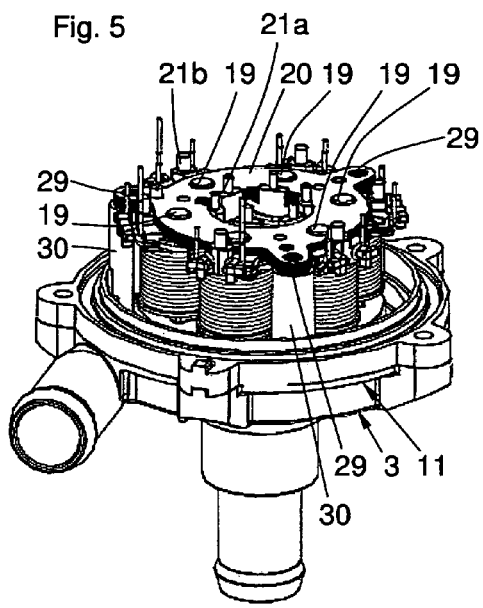

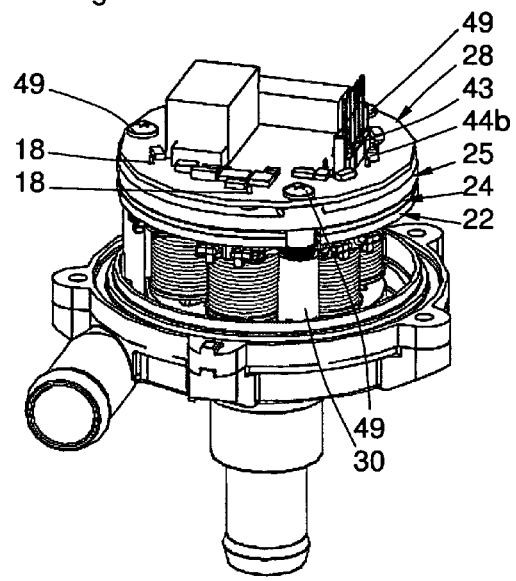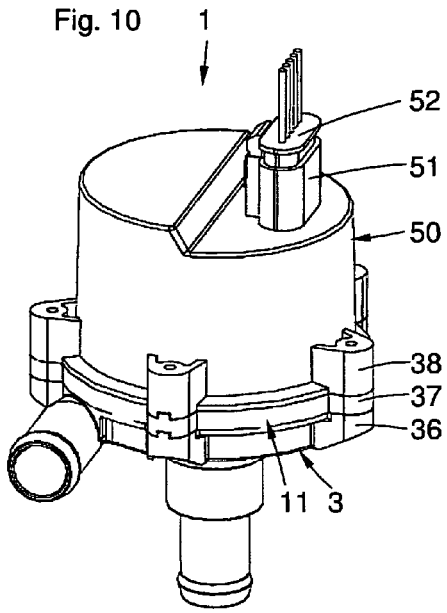

ELECTRICALLY COMMUTATED DC MOTOR FOR A LIQUID PUMP

BACKGROUND OF THE INVENTION (1) Field of the Invention

The invention concerns an electrically commutated DC motor for a liquid pump with a pump housing with a suction connector and a pressure connector for connection to a hydraulic circuit, an essentially disk-shaped pump rotor mounted to rotate in the pump housing, consisting of an impeller with several pump vanes and a permanent magnet, a partition separating a pump space from a dry space, the partition being arranged in an axial gap between the pump rotor and several axially aligned stator poles of the DC motor, each provided with an insulation element and a stator winding.

(2) Description of Related Art Including Information Disclosed Under 37 CFR 1.97 and 1.98

A generic electronically commutated DC motor for a liquid pump is known from DE 196 46 617 A1. The connections in the known DC motor are only held in a plug cover without special securing measures and are in direct contact with a circuit board. The same circuit board is directly connected to the winding connections. This structure is not stable and under extreme loads and after a longer running time leads to damage and failures.

An object of the present invention is to configure a DC motor, so that it is simple and reliable to install, is designed particularly robust and therefore has a very high lifetime.

BRIEF SUMMARY OF THE INVENTION

The object is met according to the invention by the commutated DC motor for a liquid pump having a pump housing with a suction connector and a pressure connector for connection to a hydraulic circuit. The DC motor comprises a motor shaft; an essentially disk-shaped pump rotor mounted to the motor shaft to rotate in the pump housing, the rotor having of an impeller with several pump vanes and a permanent magnet; a plurality of axially aligned stator poles; an axial air gap between the pump rotor and the axially aligned wound stator poles; a partition separating a pump space from a dry space, the partition being arranged in the axial gap; a plurality of one piece insulation elements having moldings, the insulation elements being provided on each of the poles; first and second receptacles defined in each of the insulation elements; a stator return mated within each first receptacle; a plurality of stator windings each having first and second winding ends, the stator windings being wound on the poles, the first and second winding ends are mechanically fastened to the moldings; and a first circuit board fastened axially and radially to the second receptacles of the insulation elements.

Through the identically designed insulation elements, the number of parts is reduced, so that more reliable assembly is possible. The individual poles permit simple winding of the stator windings and handling of the wound poles and subsequent mounting of a circuit board are simplified by the moldings for fastening of the winding ends. The receptacles ensure simple assembly of a return. The return then assists in alignment of the individual stator poles with their insulation elements and improves the stability of the stator in the installed state. In addition, the robustness of the stator is ensured by radially and axially shape-mated connections between the insulation elements and a circuit board.

BRIEF DESCRIPTION OF THE SEVERAL VIEWS OF THE DRAWINGS

A practical example of the invention is explained below further below with reference to the drawing. In the drawing;

FIG. 5 shows the arrangement from FIG. 4 with a mounted stator return,

FIG. 6 shows the arrangement from FIG. 5 with the mounted contact support,

FIG. 7 shows the arrangement from FIG. 6 with a mounted circuit board,

FIG. 8 shows the arrangement from FIG. 7 with a mounted heat-conducting element, FIG. 9 shows the arrangement from FIG. 8 with an equipped circuit board, FIG. 10 shows the arrangement from FIG. 9 with a mounted motor housing, FIG. 11 shows a view of the partition from an opposite perspective, FIG. 12 shows a view of the stator poles from the same perspective.

DETAILED DESCRIPTION OF THE INVENTION

Figure 1:
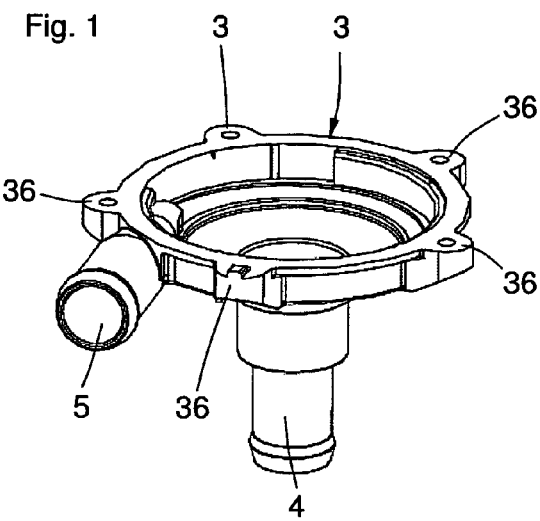
FIG. 1 shows a three-dimensional view of a pump housing.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a three-dimensional view of a pump housing 3, consisting of plastic material with a suction connector 4, a pressure connector 5 and screw mounting eyes 36.

Figure 2:
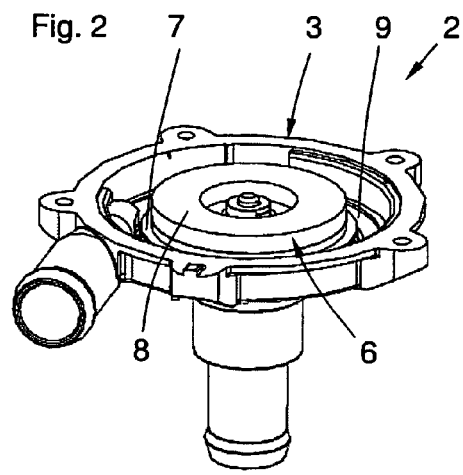
FIG. 2 shows the pump housing from FIG. 1 with an assembled pump rotor.

FIG. 2 shows the pump housing 3 from FIG. 1 with a pump rotor 6 mounted in a pump space 9, which is mounted to rotate on a shaft. The pump rotor 6 consists essentially of a permanent magnet 8 in the form of an alternating magnetized permanent magnet ring connected to an impeller 7.

Figure 3:
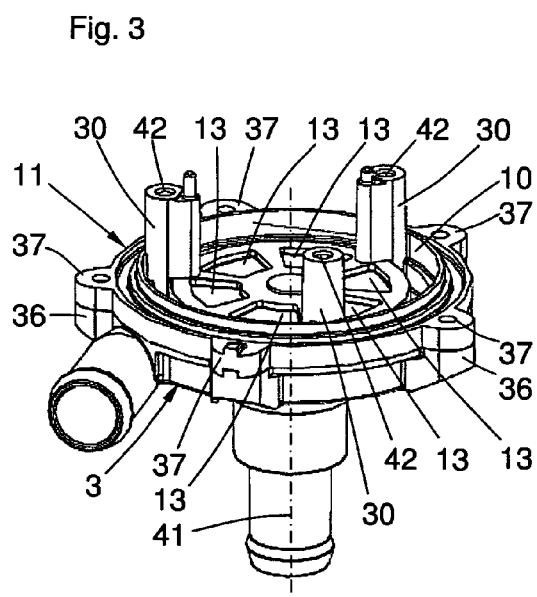
FIG. 3 shows the arrangement from FIG. 2 with a mounted partition.

FIG. 3 shows the arrangement from FIG. 2 with a mounted partition 11 that separates the pump space from a dry space 10. The partition 11 also has screw mounting eyes 37 corresponding to the screw mounting eyes 36 of the pump housing 3. The partition 11 has recesses 13 to accommodate stator poles, especially their pole shoes. The partition 11 also in one piece with three fastening bushings 30 provided with internal thread 42, which extend parallel around a motor shaft 41 from the partition plane.

Figure 4:
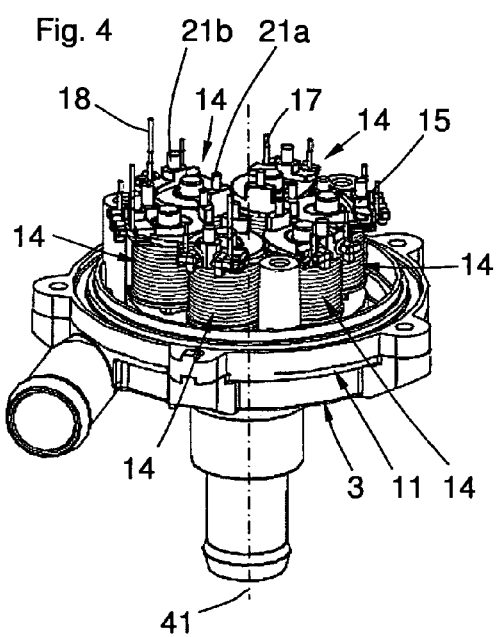
FIG. 4 shows the arrangement of FIG. 3 with mounted wound stator poles.

FIG. 4 shows the arrangement from FIG. 3 with six mounted wound stator poles 14 aligned axially and parallel and uniformly distributed around the motor shaft 41. The stator poles 14 are each enclosed by an insulation element 15 provided with a stator winding 16. The windings are mechanically fastened to the insulation element 15 and their ends 17, 18 extend parallel to motor shaft 41. First winding ends 17 end in a first pane, whereas second winding ends 18 are designed longer than the first winding ends 17 and end in a second plane. The insulation elements 15 are in one piece with receptacles 21a, 21b that extend pin-like axially and parallel from the side facing away from the pump. The further description of the stator poles 14 occurs relative to FIGS. 16 to 19.

FIG. 5 shows the arrangement of FIG. 4 with a mounted stator return 20, which consists of a laminated core of several identically designed return sheets. This stator return 20 has fastening devices 29, consisting of three radial protrusions with disk-like punch-outs that are covered with the inside thread 42 of the fastening bushings 30. Protrusions are provided on two fastening bushings 30, in addition to internal thread 42, which are dimensioned differently and are supposed to prevent incorrect assembly of the stator return 20. Each pole has a mounting pin 19, which engages in a correspondingly designed recess of the stator return 20. The stator return 20 is designed ring-like and runs within the circle described by the receptacles 21a and 21b. The stator return 20 is secured against loosening with the stator poles 14 by a deformation process, like caulking.

FIG. 6 shows the arrangement from FIG. 5 with a mounted contact support 22, consisting of plastic material. The contact support 22 is in one piece with contact receptacles 43, mounting pins 23, openings for the receptacles 21a and 21b of the insulation elements, openings for the winding end 17 with recesses 45 in the area of the fastening bushiness 30, with a central recess 47 and centering pins 44a, 44b. The mounting pins 23 are designed hollow and accommodate the second winding ends 18, which, in the assembled state of the contact support, protrude significantly from the hollow mounting pins 23. The contact supports are shaped so that U-shaped bent contacts can be sealed in them. Part of the U-shaped connection contacts 26 and, on one side, on a first side directed toward the motor shaft, and on the other side in a plug plane, and another part of the U-shaped connection contacts 26 and, on the one side, on a second side facing away from the motor shaft, and on the other side in the plug plane.

FIG. 7 shows the arrangement in FIG. 6 with a mounted circuit board 24, which is essentially formed with the same passages and recesses as the contact support 22. In particular, the circuit board 24 has recesses 46 in the area of the fastening bushings 30, central recess 48 and different openings for the receptacles 21a, 21b of the insulation elements, for the hollow mounting pins 23 of the contact support and for contact openings for electrical and mechanical connection of the first shorter winding end 17 to the circuit board, especially with soldering eyes that are partially connected to each other via conductor tracks 27. An opening for the contact receptacles 43 and the centering pins 44a is also present. The receptacles 21a and 21b are shaped according to a heat deformation process, so that the circuit board 24 and the contact support 22 are firmly connected to the six insulation elements in shape-mated fashion, the receptacles 21a, 21b being deformed in the fashion of rivet heads.

FIG. 8 shows the arrangement of FIG. 7 with a mounted heat-conducting element 25. The heat-conducting element 25 consists of aluminum and is provided with recesses for hollow mounting pins 23, centering pins 44a and the contact receptacles 43. The heat-conducting element 25 is also in one piece with spacers 31a, which engage in recesses 45 of the contact support 22 and recesses 46 of circuit board 24 and extend up to the return 20. On the side of the heat-conducting element opposite the spacers 31a, additional spacers 31b are provided, which serve to accommodate an additional circuit board. The heat conducting element consists of a first essentially disk-like area and a second essentially hollow cylindrical area, which is centrally connected to the disk-like area and extends over the central recess 48 of the circuit board 24 and the central recess 47 of contact support and a central recess of the stator return up to the partition 11.

FIG. 9 shows the arrangement from FIG. 8 with an equipped circuit board 28. The circuit board 28 has contact openings for passage of the winding ends 18, which are electrically and mechanically connected at soldering eyes to circuit board 28. This circuit board 28 also has an opening for the contact receptacles 43. The circuit board 28 lies axially against the spacers 31b and radially against the centering pins 44a, 44b and is screwed to the fastening bushings 30 with screws 49, so that they also fasten heat conducting element 25 and the stator return, in addition to the circuit board 28.

FIG. 10 shows the arrangement from FIG. 9 with mounted motor housing 50, which is in one piece with a plug housing 51, into which a plug 52 is inserted. The motor housing is also in one piece with screw mounting eyes 38, in which these agree with the screw mounting eyes 37 of partition 11 and the screw mounting eyes 36 of the pump housing.

FIG. 11 shows a view from the opposite perspective of the partition 11 with the motor housing connected to it. The partition 11 and the motor housing delimit the dry space, in which the stator of the DC motor is situated. The partition 11 is in one piece with a bearing mount 53 to accommodate an axial bearing to support the pump rotor.

FIG. 12 shows a view from the same perspective of the stator poles 14, with the insulation elements 15, windings 16 and the hollow cylindrical area of the heat-conducting element 25.

Figure 13A:
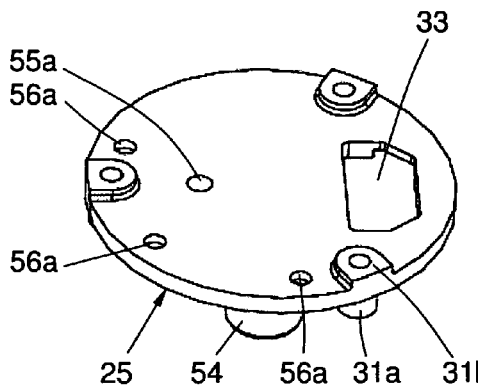
FIGS. 13a, 13b show views of the heat-conducting element.
Figure 13B:
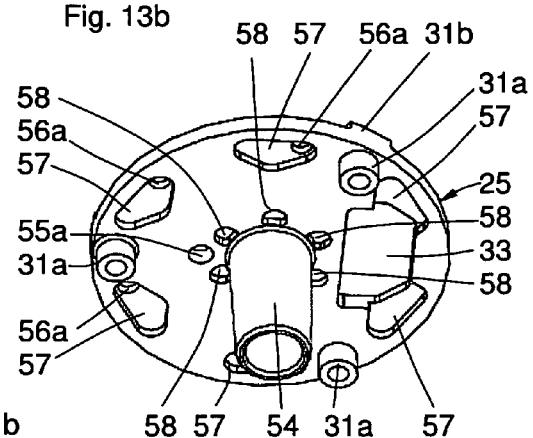

FIGS. 13a, 13b show views of the heating conducting element 25 with an opening 55a for the centering pins 44a, three openings 56a for the mounting pins 23 of the contact support, a plug recess 33, spacers 31a and 31b and a hollow cylindrical area 54 arranged centrally on the heat conducting element.

In FIG. 13b, large recesses 57 and small recesses 58 are also provided for the soldering sites and rivet heads.

Figure 14A:
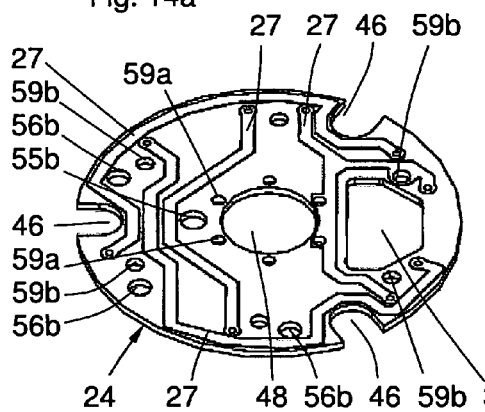
FIGS. 14a, 14b show views of the circuit board.
Figure 14B:
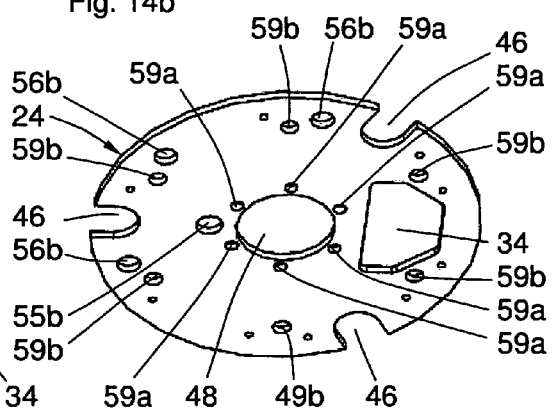

FIGS. 14a, 14b show views of the circuit board 24 with conductor tracks 27, openings 59a for internal mounting of the insulation element, openings 59b for outer mounting of the insulation element, central recess 48, opening 55b for the centering pins 44a, openings 56b for the mounting pins 23 of the contact support, recesses 46 for the spacers of the heat conducting element, a plug recess 34 and additional openings for the winding ends.

Figure 15A:
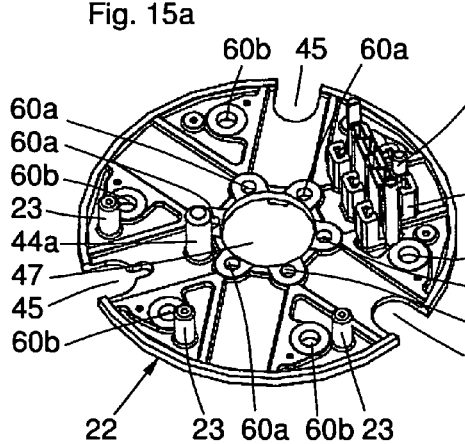
FIGS. 15a, 15b show views of the contact support.
Figure 15B:
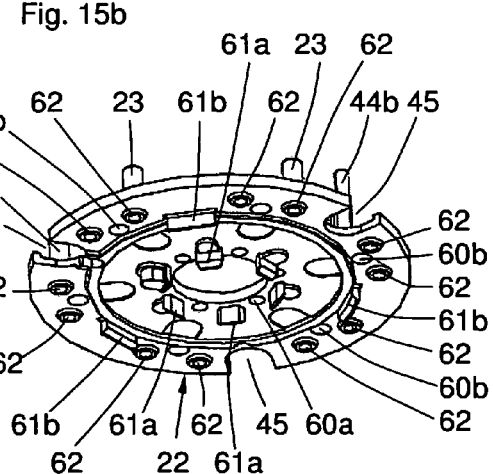

FIGS. 15a, 15b show views of the contact support 22 with centering pins 44a, 44b, the hollow mounting pins 23, the contact receptacles 43 that are in one piece with the contact support, recesses 45 for the spacer of the heating conducting element, the central recess for accommodating the cylindrical part of the heat conducting element, openings 60a for the internal receptacles of the insulation elements, openings 60b for the external receptacles of the insulation elements and openings for the winding wire ends. Inner centering devices 61a, outer centering devices 61b for mounting on the stator return and joining aids 62, designed essentially conical, in order to be able to join the winding ends more simply during assembly of the contact support, are also shown in FIG. 15b.

Figure 16:
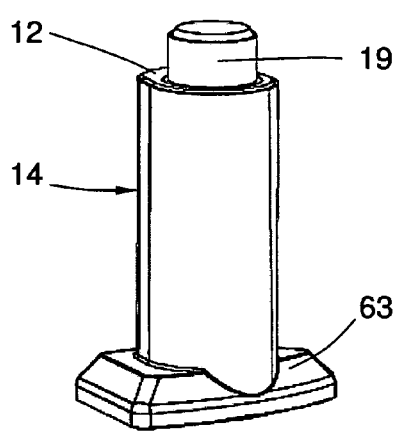
FIG. 16 shows a view of a stator pole.

FIG. 16 shows a view of a stator pole 14, comprising a mounting hole 19 for connection to the stator return and a pole shoe 63, having a roughly circular segment-like cross-sectional surface. The stator pole 14 in the present practical example consists of a magnetically conducting material pressed and sintered from the powder form.

Figure 17:
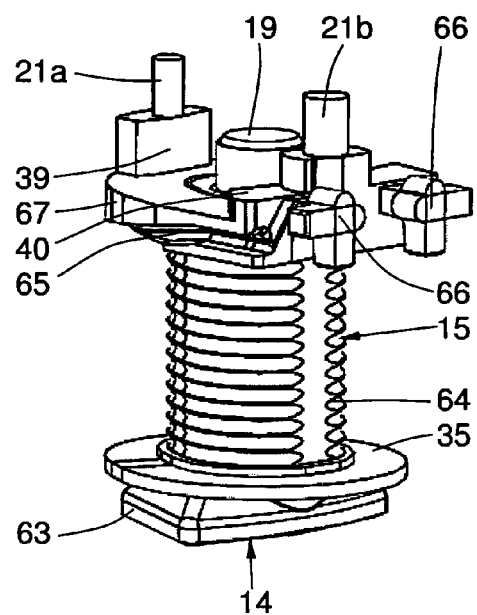
FIG. 17 shows the stator pole from FIG. 16 with mounted insulation elements.

FIG. 17 show the stator pole from FIG. 16 with the mounted insulation element 15, with the contact flange 67, a collar 35, grooves 64 in the base of the insulation element, which serve to achieve regular arrangement of the winding wires, a wire guide 65, in order to bring the wire ends in defined fashion against molding 66 after the winding process, and then to wind around the corresponding fastening devices, in which one winding is sufficient. After production of the winding, both winding ends 17 are aligned axial and parallel to the pole axis, and later also the motor axis. The insulation element also has receptacles 39 and 40 to accommodate the stator return 20. The inner pin-like receptacle 21a and the outer pin-like receptacle 21b are connected to the receptacles 39 and 40. Both are aligned axial and parallel.

Figure 18:
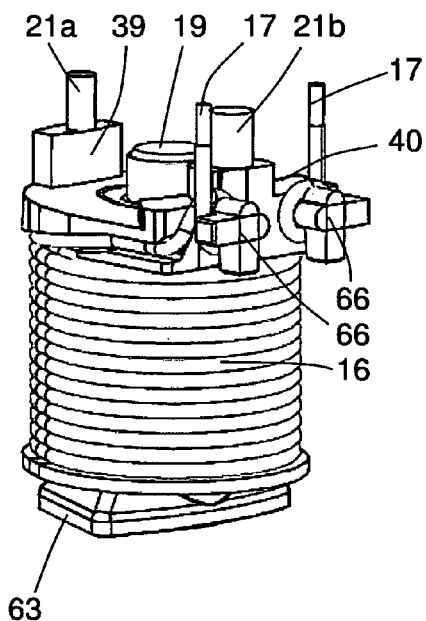
FIG. 18 shows the arrangement from FIG. 17 with a winding.

FIG. 18 shows the arrangement from FIG. 17 wound with a winding 16. It is readily apparent here how the wire guide is positioned with the winding wire and how the winding wire end is wound around the fastening device.

Figure 19:
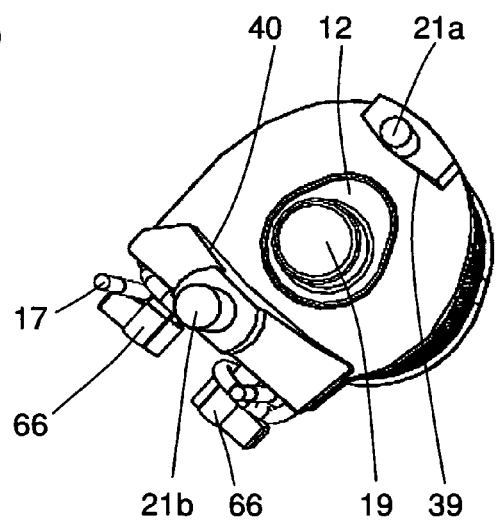
FIG. 19 shows the arrangement from FIG. 18 from another perspective.

FIG. 19 shows the arrangement from FIG. 18 from another perspective. It is readily apparent here that the pole has a polygonal cross section 12. This primarily serves to prevent rotation and finally also for better utilization of space.

Figure 20A:
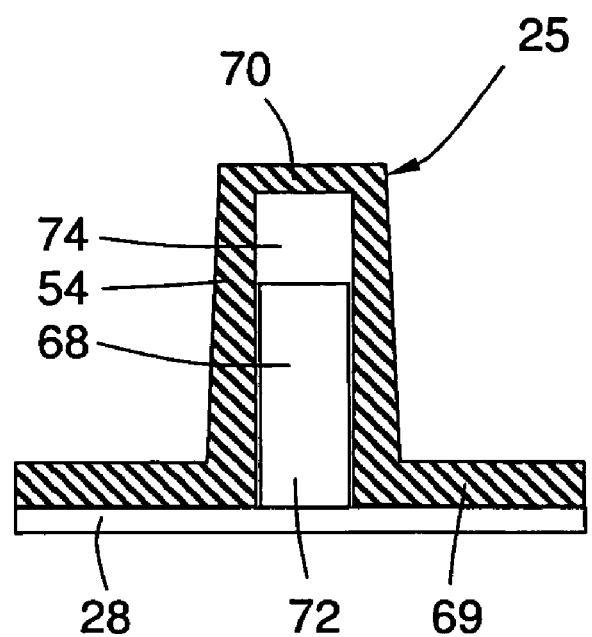
FIG. 20a shows a second variant of the heat conducting element and FIG. 20b shows a third variant of the heat-conducting element.

FIG. 20a shows a second variant of the heat-conducting element 25, in which the disk-like area 69 is provided centrally with a central opening 72 and the hollow cylindrical area 54 is closed by a bottom 70 on its side facing the pump impeller. Through this embodiment, the possibility is obtained of accommodating a capacitor 68 arranged on circuit board 28 in space-saving fashion in a mounting space 74 of the heat-conducting element 25.

Figure 20B:
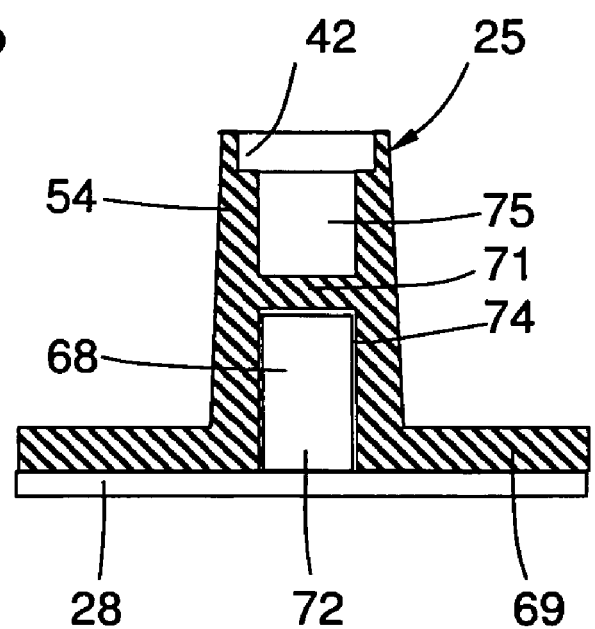

FIG. 20b shows a third variant of the heat-conducting element 25, in which the hollow cylindrical area 54 is open on both sides, but a partition 71 is provided in its center area, which separates the dry space from the wet space. In this variant, the partition 11 (not shown here) is also perforated, so that an additional wet space 75 extends to partition 71. The third variant combines the first two variants of the heat conducting element 25 with each other. In the first place, an installation space for the capacitor 68 is present and, in the second place, part of the hollow cylindrical area 54 can also be used as a cooling channel. On the end of the hollow cylindrical area 54, there is a receiving space 73 for a bearing.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically disclosed.

LIST OF REFERENCE NUMBERS

1 DC motor
2 Liquid pump
3 Pump housing
4 Suction connector
5 Pressure connector
6 Pump rotor
7 Pump impeller
8 Permanent magnet
9 Pump space
10 Dry space
11 Partition
12 Polygonal cross section
13 Recesses
14 Stator pole
15 Insulation element
16 Stator winding
17 First winding end
18 Second winding end
19 Mounting pin
20 Stator return
21a Receptacle
21b Receptacle
22 Contact support
23 Hollow mounting pin
24 First circuit board
25 Heat conducting element
26 Connection contact
27 Circuit
28 Conductor track
29 Equipped circuit board
30 Fastening device
31 Fastening bushing
31a Spacer
31b Spacer
33 Plug recess
34 Plug recess
35 Collar
36 Screw connection eye
37 Screw connection eye
38 Screw connection eye
39 Receptacle for return
40 Receptacle for return
41 Motor shaft
42 Internal thread
43 Contact receptacle
44a Centering pin
44b Centering pin
45 Recesses in contact support
46 Recesses in circuit board
47 Central recess in support
48 Central recess in circuit board
49 Screw
50 Motor housing
51 Plug housing
52 Plug
53 Bearing mount
54 Hollow cylindrical area
55a Opening for centering pin
55b Opening for centering pin
56a Opening for mounting pin
56b Opening for mounting pin
57 Large recess
58 Small recesses
59a Opening for receptacle inside
59b Opening for receptacle outside
60a Opening for receptacle inside
60b Opening or receptacle outside
61a Internal centering device
61b External centering device
62 Joining aid
63 Pole shoe
64 Groove
65 Wire guide
66 Moldings
67 Contact flange
68 Capacitor
69 Disk-like area
70 Bottom
71 Partition 72 Central opening
73 Receiving space for bearing
74 Receiving space for capacitor
75 Additional wet space

What is claimed is:

1. A commutated DC motor for a liquid pump having a pump housing with a suction connector and a pressure connector for connection to a hydraulic circuit, the DC motor comprising:
   a motor shaft;
   an essentially disk-shaped pump rotor mounted to the motor shaft to rotate in the pump housing, the rotor having of an impeller with several pump vanes and a permanent magnet;
   a plurality of axially aligned stator poles;
   an axial air gap between the pump rotor and the axially aligned stator poles;
   a partition separating a pump space from a dry space, the partition being arranged in the axial gap;
   a plurality of one piece insulation elements having moldings, the insulation elements being provided on each of the poles;
   first and second receptacles defined in each of the insulation elements;
   a stator return mated within each first receptacle;
   a plurality of stator windings each having first and second winding ends, the stator windings being wound on the poles, the first and second winding ends are mechanically fastened to the moldings; and
   a first circuit board fastened axially and radially to the second receptacles of the insulation elements.

2. The DC motor according to claim 1, wherein the first and second ends of the stator windings are aligned parallel to the motor shaft.

3. The DC motor according to claim 1, wherein part of the first winding ends are mechanically and electrically connected to the first circuit board, the first circuit being arranged in a first plane parallel to the partition, the first circuit board having conductor tracks for interconnection of the first winding ends of the stator windings.

4. The DC motor according to claim 3, further comprising a second equipped circuit board provided with a control circuit arranged in a second plane parallel to the partition, wherein the second winding ends are mechanically and electrically connected to the second circuit board.

5. The DC motor according to claim 4, further comprising connection contacts, and a contact support arranged between the insulation elements and the first circuit board, the contact support having contact receptacles for mechanical fastening of the connection contacts.

6. The DC motor according to claim 5, wherein the connection contacts are electrically and mechanically connected exclusively to the second circuit board.

7. The DC motor according to claim 5, wherein the receptacles of the insulation elements fasten the contact support.

8. The DC motor according to claim 1, wherein each insulation element is provided with two receptacles, one receptacle being arranged radially inward and one receptacle radially outward relative to the motor shaft.

9. The DC motor according to claim 5, wherein the contact support and the first circuit board are connected to the insulation elements by a heat deformation process.

10. The DC motor according to claim 5, further comprising a heat conducting element, and wherein that the contact support is equipped with mounting pins to accommodate the first circuit board and the heat conducting element.

11. The DC motor according to claim 10, wherein at least one mounting pin of the contact support is hollow and serves as a guide and mounting device for the second winding ends.

12. The DC motor according to claim 1, wherein the stator poles are each in one piece and include a mounting pin that engages in corresponding recesses of the stator return.

13. The DC motor according to claim 1, wherein that the stator return has fastening devices that lie against fastening bushings that protrude post-like from the partition.

14. The DC motor according to claim 5, wherein the stator return is centered on the first and second receptacles of the insulation elements and the contact support has centering devices, with which it is centered on the stator return.

15. The DC motor according to claim 1, wherein the cross-sectional shape of the stator poles and the insulation elements are chosen so that they cannot rotate relative to each other.

16. The DC motor according to claim 4, further comprising a heat conducting element arranged between the first and second circuit boards parallel to partition.

17. The DC motor according to claim 16, wherein the heat conducting element is one piece with spacers that engage in recesses of the contact support and recesses of the first circuit board and extend to the stator return.

18. The DC motor according to claim 16, wherein the second circuit board, the heat conducting element and the stator return are screwed to the partition by fastening bushings.

19. The DC motor according to claim 16, wherein the first circuit board, the heat conducting element and the second circuit board each have a plug recess for connection contacts and their mounting part.

20. The DC motor according to claim 16, wherein the heat conducting element consists of a disk-like area and a central hollow cylindrical area, which is arranged within a circle defined by the stator poles and extends to the partition.

21. The DC motor according to claim 16, further comprising a capacitor, wherein the heat conducting element has a central opening in its disk-like area and a receiving space for the capacitor, the capacitor being arranged in the second circuit board and extending into receiving space.

* * * * *